May 29, 1928.

C. M. GEARING 1,671,711

WORK SUPPORTING AND CENTERING DEVICE

Filed June 27, 1924

INVENTOR:
CHARLES M. GEARING,
BY
HIS ATTORNEY.

Patented May 29, 1928.

1,671,711

UNITED STATES PATENT OFFICE.

CHARLES M. GEARING, OF MERIDEN, CONNECTICUT, ASSIGNOR TO THE NEW DEPARTURE MANUFACTURING COMPANY, OF BRISTOL, CONNECTICUT, A CORPORATION OF CONNECTICUT.

WORK SUPPORTING AND CENTERING DEVICE.

Application filed June 27, 1924. Serial No. 722,665.

When grinding the external surfaces of sleeves, such as race rings for antifriction bearings, it has been the practice for the operator to support a holder loaded with work pieces with one hand and, with the other, move up a tail stock to hold the work between lathe centers. When a narrow grinding wheel is used, there is room for the operator's hand at one side of the wheel but, if a wide grinding wheel is used for simultaneous action on a series of work pieces in axial alignment, the operator cannot safely hold them. Furthermore the weight of the work pieces is sometimes considerable and the effort of holding them while centering is very fatiguing.

It is an object of this invention, therefore, to provide a work supporting and centering device which will avoid the danger of injury to the operator and relieve him of the fatigue incident to sustaining heavy work while centering. Another object is to provide a simple inexpensive device of this character which can be easily applied to existing machines to facilitate the centering of work pieces of different diameters.

To these ends and also to improve generally upon devices of the character indicated, my invention consists in the various matters hereinafter described and claimed.

Figure 1:
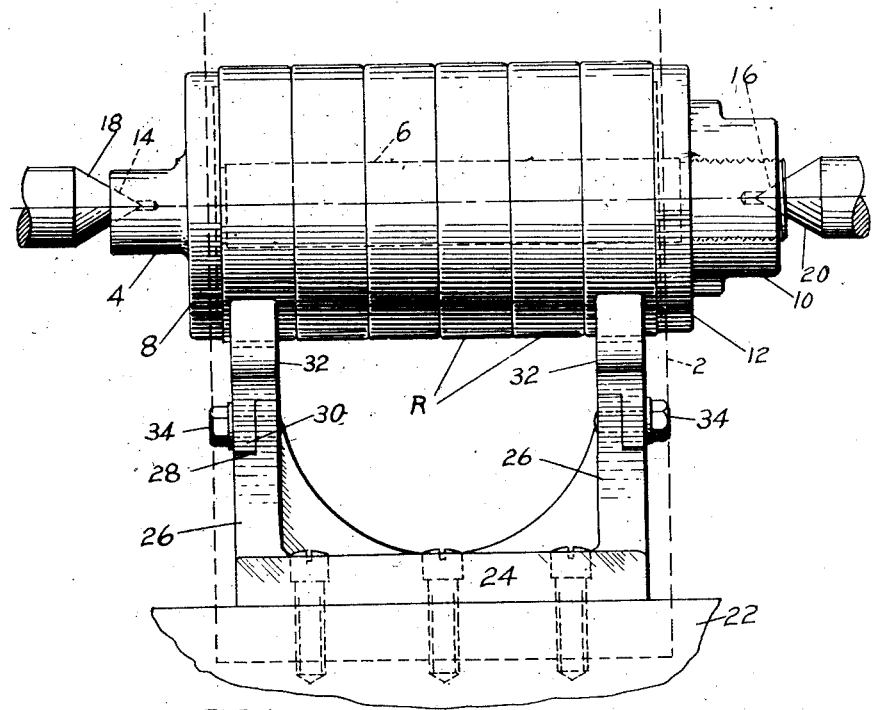
Figure 2:
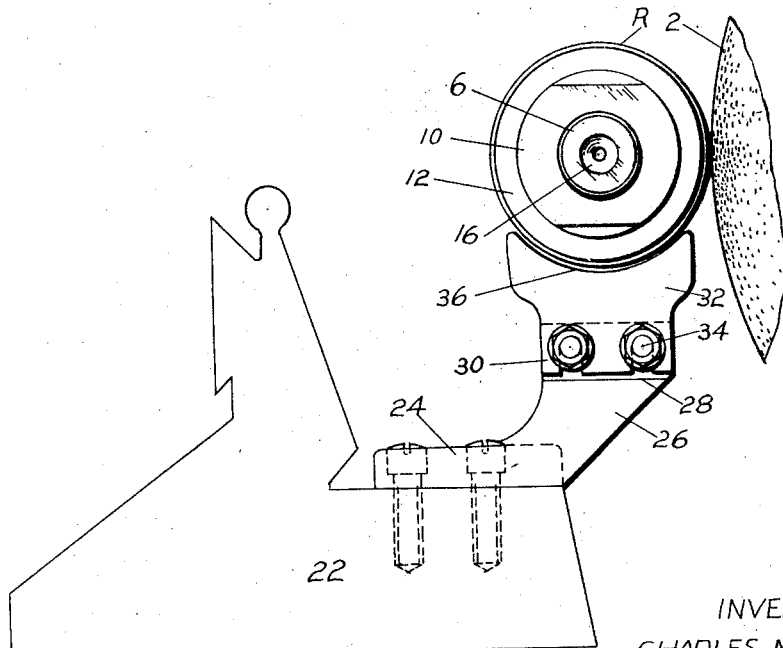

Referring to the drawings, Figure 1 is a front elevation of a portion of a grinding machine with my attachment applied and Figure 2 is an end elevation with the tail stock removed.

The numeral 2 indicates a working tool, herein shown as a wide grinding wheel which is rotatably supported in any suitable manner on a carriage by which it can be fed up to the work. If desired, the wheel may also be reciprocated axially to insure even wear. The wheel is at the rear of a series of work-pieces, herein shown as race rings R, clamped in axial alignment on a work carrier 4. The carrier comprises an arbor 6 with an integral collar 8 near one end and a nut 10 threaded on the other reduced end, a clamping collar or washer 12 being interposed between the nut and the endmost work-piece. The ends of the arbor are provided with tapered openings 14 and 16 adapted to be engaged by conical lathe centers 18 and 20 which have relative movement of approach, the tail center 20 preferably being movable endwise in the usual way. The work pieces R may, of course, be rings or sleeves or assembled bearings and may fit the arbor 6 or have locating devices between their inner surfaces and the arbor.

Bolted permanently to the frame 22 of the machine is a base plate 24 having integral end standards 26, each standard being recessed at 28 to receive a fastening tongue 30 on a shouldered cradle plate or trough 32 which is removably bolted to the end standard by bolts 34. Each removable cradle plate has a concave work engaging portion 36 which is open upwardly and curved on an arc of approximately the same radius as that of the work-pieces being ground. The work engaging portions 36 lie in vertical alignment with the lathe centers, directly under the arbor 6 when the latter is in work rotating position and the concavities terminate a little below the surface of the work pieces. Hence, the arbor, if loaded with one or more work-pieces and laid in the cradle plates, will be lifted from the cradle plates and automatically centered when the tail center 20 is moved towards its cooperating lathe center 18. During this operation, the conical faces of the lathe centers enter the tapered openings 14 and 16 in the arbor, and the cradle plates, being open upwardly, release the work to the lathe centers.

When work-pieces of a different diameter are to be ground, the cradle plates are removed and replaced by others having a curvature approximately corresponding to that of the work. The curvature need not be circular but the cradle plate or plates should be near enough to the rotating position of the work-pieces to allow the lathe centers to enter the openings in the arbor. While one series of work-pieces is being ground, another arbor can be loaded with similar work-pieces in readiness to be inserted in the cradle when the first series is removed. Some of the advantages of the invention are obtainable without the use of the arbor.

Although the invention has been described by reference to a certain specific construction, it should be understood that the invention, in its broader aspects, is not necessarily limited to the form selected for illustration.

I claim:

1. In a machine of the character described, a loadable work carrier comprising an arbor having a fixed collar near one end and a clamping collar near the other end, said arbor holding a plurality of hollow work pieces in axial alignment and having a pair of end openings, spaced and tapered lathe centers having relative movement of approach, and a stationary cradle for supporting the loaded arbor in approximate alignment with but below the lathe centers and allowing the arbor to be lifted when the approach of the lathe centers causes them to engage the end openings in the arbor; substantially as described.

2. In a machine of the character described, in combination, a pair of aligned, spaced and tapered lathe centers having relative movement of approach, a carrier for work pieces, said carrier having opposite openings in its ends for the lathe centers and being removable for loading, and a cradle for temporarily supporting the work carrier in approximate alignment with but below the lathe centers, said cradle allowing the work carrier to be lifted from it upon relative movement of the lathe centers; substantially as described.

3. In a machine of the character described, in combination, a pair of lathe centers having relative movement of approach, and a support for temporarily holding a work piece in approximate alignment with respect to the lathe centers, said support comprising a base plate having end standards and a pair of shouldered cradle plates detachably secured to the end standards; substantially as described.

4. In a machine of the character described, in combination, a pair of spaced and tapered lathe centers having relative movement of approach, an arbor having opposite collars for clamping work pieces between them, said arbor having openings at its ends for engagement with said lathe centers, and a temporary work support under the arbor and having a surface terminating below the grinding position of the work; substantially as described.

In testimony whereof I hereunto affix my signature.

CHARLES M. GEARING.